(12) United States Patent
Trench

(10) Patent No.: US 9,861,915 B2
(45) Date of Patent: Jan. 9, 2018

(54) CENTRIFUGAL SCREEN APPARATUS

(71) Applicant: WEIR MINERALS AUSTRALIA LIMITED, New South Wales (AU)

(72) Inventor: Michael Trench, Queensland (AU)

(73) Assignee: Weir Minerals Australia Limited, New South Wales (AU)

( * ) Notice: Subject to any disclaimer, the term of this patent is extended or adjusted under 35 U.S.C. 154(b) by 167 days.

(21) Appl. No.: 14/347,590

(22) PCT Filed: Sep. 27, 2012

(86) PCT No.: PCT/AU2012/001168
§ 371 (c)(1),
(2) Date: Mar. 26, 2014

(87) PCT Pub. No.: WO2013/044303
PCT Pub. Date: Apr. 4, 2013

(65) Prior Publication Data
US 2015/0041384 A1 Feb. 12, 2015

(30) Foreign Application Priority Data
Sep. 27, 2011 (AU) .................. 2011903977

(51) Int. Cl.
*B01D 33/00* (2006.01)
*B01D 35/22* (2006.01)
(Continued)

(52) U.S. Cl.
CPC ............... *B01D 33/11* (2013.01); *B04B 3/00* (2013.01); *B04B 7/18* (2013.01)

(58) Field of Classification Search
USPC ................. 210/327, 405, 499, 297
See application file for complete search history.

(56) References Cited

U.S. PATENT DOCUMENTS

| 4,186,097 A * | 1/1980 | Dudley | ..................... B04B 3/00 |
| | | | 210/377 |
| 4,253,960 A * | 3/1981 | Dudley | ..................... B04B 3/00 |
| | | | 210/373 |

(Continued)

FOREIGN PATENT DOCUMENTS

| AU | WO 2005089963 A1 * | 9/2005 | ............... B07B 1/18 |
| AU | WO 2008116245 A1 * | 10/2008 | ............... B07B 1/22 |

(Continued)

OTHER PUBLICATIONS

European Patent Office, Supplementary European Search Report for EP12835568, dated Apr. 29, 2015.

(Continued)

*Primary Examiner* — Ana Fortuna
(74) *Attorney, Agent, or Firm* — Gardere Wynne Sewell LLP

(57) ABSTRACT

Screening apparatus includes a driving a shaft (12) into a screen housing (13) having a removable closure (14) and dividing wall (15) forming an underflow chamber (16) and an overflow chamber (17). The shaft (12) supports and drives an screen (21) comprising a plate steel basket carrier portion (22) axially spaced from intermediate ring frames (23) and an outer frame ring and flange (24), all interconnected by circumferentially spaced stringers (25) to form an all-welded, integral, generally truncated-conical screen (21) cage. The cage supports a wedge wire screening surface (26). The closure (14) and housing (13) mutually support an inlet assembly (27) comprising a chute (32) feeding the water and coarse coal to the inner end of the screen assembly (21). The integral, all welded screen (21) may be replaced as a unit without refurbishment.

16 Claims, 6 Drawing Sheets

(51) Int. Cl.
*B01D 21/24* (2006.01)
*B01D 24/00* (2006.01)
*C02F 1/38* (2006.01)
*B01D 33/11* (2006.01)
*B04B 3/00* (2006.01)
*B04B 7/18* (2006.01)

(56) References Cited

U.S. PATENT DOCUMENTS

| | | | |
|---|---|---|---|
| 5,019,196 A * | 5/1991 | McKibben | B22C 5/0472 |
| | | | 156/299 |
| 5,788,861 A | 8/1998 | Serenkin | |
| 6,663,774 B2 | 12/2003 | Flansburg et al. | |
| 6,676,874 B1 * | 1/2004 | Muller | F16B 33/008 |
| | | | 264/249 |
| 2008/0280746 A1 * | 11/2008 | McAlister | B03B 5/32 |
| | | | 494/8 |
| 2011/0028296 A1 * | 2/2011 | Zonneveld | B04B 1/00 |
| | | | 494/29 |

FOREIGN PATENT DOCUMENTS

| | | |
|---|---|---|
| AU | 2010100939 A4 | 10/2010 |
| CA | 2625843 A1 | 9/2009 |
| CN | 201168654 Y | 12/2008 |
| CN | 103842091 A | 6/2014 |
| GB | 2033242 A | 5/1980 |
| GB | 2260915 A | 5/1993 |
| WO | WO-2008/116245 | 10/2008 |
| WO | WO-2011011862 A1 | 2/2011 |

OTHER PUBLICATIONS

Chinese Patent Application No. CN 201280047386, Search dated May 19, 2015, 2 pgs.
Chinese Patent Application No. CN 201280047386, Office Action dated May 27, 2015, 9 pgs.
Chinese Patent Application No. CN 201280047386, Search dated Apr. 7, 2016, 1 pg.
Chinese Patent Application No. CN 201280047386, Office Action dated Apr. 15, 2016, 4 pgs.
Chinese Patent Application No. CN 201280047386, Office Action dated Oct. 11, 2016, 5 pgs.

* cited by examiner

CENTRIFUGAL SCREEN APPARATUS

FIELD OF THE INVENTION

This invention relates to centrifugal screen apparatus. This invention has particular application to centrifugal screen apparatus for use in separating particulates from water and fines, and for illustrative purposes the invention will be described with reference to this application. However we envisage that this invention may find use in other centrifugal liquid-entrained particulates handling apparatus generally.

BACKGROUND OF THE INVENTION

The reference to any prior art in this specification is not, and should not be taken as, an acknowledgement or any form of suggestion that the referenced prior art forms part of the common general knowledge in Australia.

Minerals such as coal may be wet processed and substantially dewatered by continuous flow through a solids/particulates/water/air separating centrifugal screening apparatus including a rotating conical screen assembly disposed in a housing. The screen assembly generally comprises a basket driven (by a motor with a shaft passing through a wall of the housing) from its narrow inner end by a basket carrier, essentially a drive plate bolted to the output flange of the shaft, that doubles as a closure for the screen narrow inner end. The coarse mineral/water stream is directed by an inlet assembly passing into the housing at the wider outer end of the screen and deposits the stream at the narrower inner end of the screen. The housing about the screen is divided into an underflow chamber generally corresponding to the outer conical surface of the screen and an overflow chamber accepting mineral passing out of the open wider end of the screen. The respective under and overflow chambers pass water/fines and washed mineral to respective outlets.

Wet mineral screening is a high wear environment. The baskets are generally formed of a welded steel frame formed of flat bar stringers interconnecting axially spaced plate steel hoops. The steel is often stainless steel. The inner narrower end is fabricated with a hoop forming a drive flange. The conical surface described by the cage formed of the stringers and hoops is substantially closed by a screening surface which may be formed of wedge wires. The drive flange generally forms a welded terminal for the stringer bar ends and extends inward of the conical surface to provide a flange to which the basket carrier is bolted or cap screwed. The inner annulus of the screening surface adjacent the basket carrier is provided with a wear collar welded in place and adapted to resist accelerated wear at the basket carrier periphery/screen surface boundary region. The basket carrier is in turn bolted to an output shaft passing into the housing from an electric motor and gearbox assembly.

As a wear component the screen assembly must periodically be replaced. This requires releasing the screen assembly from the drive flange, hoisting out the screen assembly and releasing the basket carrier bolts or cap screws to release the plate.

The basket carriers are typically cast steel to provide resistance under the extraordinary wear conditions present in use at the inner end of the screen, where rotational wear intersects with the input material stream impact wear. A plate is generally cast to last 2-3 times the life of the basket, on the grounds of the cost of production of the cast basket carrier. The new basket is reassembled to the old or replacement basket carrier and the screening assembly hoisted into the housing and bolted up to the drive flange. A casting must have a minimum section to be dimensionally and mechanically stable in use, and this intersects with the need to accommodate extreme wear conditions to make it an imperative for the basket carrier to outlast 2-3 baskets.

A disadvantage of this system is that the bolts or cap screws suffer from worn heads, bound threads and other in-service damage that make the screening assemblies difficult to service. Where the basket is assembled to an old basket carrier, it is difficult to produce a balanced set on site. Damage to holes and location diameters in basket carriers requires field repair, slowing service and increasing down time. Where a change-out inventory is kept, the cost of the basket carrier increases the inventory cost over baskets alone.

SUMMARY OF THE INVENTION

In one aspect the present invention resides broadly in centrifugal screen apparatus including:
- a screen member comprising a substantially conical basket portion having an open base axially spaced from an integral basket carrier portion substantially closing a truncated end of said basket portion, said screen member being mounted for driven rotation in a housing by said basket carrier portion;
- an annular wear collar secured to said basket portion about said truncated end adjacent an outer periphery of said basket carrier portion;
- an inlet assembly passing into the housing and directing a material to be screened toward said basket carrier portion; and
- a wall dividing the housing substantially about the outer open base and defining an underflow chamber surrounding the rotating screen and an overflow chamber accepting material passing through the open base.

The basket portion is formed integrally with the basket carrier. The basket portion no longer needs to be changed out from the basket carrier portion for replacement, the respective components being adapted to wear and therefore be changed out for replacement together. Accordingly, the basket carrier portion may be economically welded to the basket portion. However, it is envisaged that the basket carrier portion may still be machine, set or cap screwed to the basket portion, but without the need to ensure removability. In this context, the basket portion and basket carrier portion are integrated by assembly.

The basket portion may be formed of a supporting structure of stainless or other steel and comprising axially spaced ring frames interconnected by a plurality of stringers. For example there may be provided axially spaced inner and outer ring frames and one or more intermediate ring frames, all interconnected by a plurality of stringers. A ring frame may extend inwardly and radially of the truncated end to form a mounting surface for the periphery of the basket carrier portion.

The supporting structure may be fabricated integrally with a screening surface comprising a plurality of wire elements. These may be longitudinal or a spiral wind about the conical axis. Alternatively the screening surface may be comprised of a screening surface insert or panel segments secured to the supporting structure. Typically the screening surface is defined by a plurality of wedge wires.

The direct implication of the basket portion and the basket carrier portion wearing together is that the basket carrier portion may be formed or fabricated from plate material. For example, the basket carrier portion may be formed from steel plate, The annular wear collar may comprise a flat bar collar that is used as a cylindrical hoop or is smithed or rolled to conform to the conical section of the screen assembly. The annular wear collar may replace a portion of, or be laid over, the screening surface. In either case the annular wear collar is supported by welding to one or more of the stringers, a ring frame and the basket carrier portion.

A ring frame may extend inwardly and radially of said truncated end to form a mounting surface for the periphery of the basket carrier portion.

The basket carrier may be formed of hot rolled plate of about 16 mm, compared to the smaller section ring frames and stringers, to provide adequate wear performance and to permit full fillet weld fabrication without uncontrolled distortion. The use of such plate has the advantage of the basket carrier being supportable on the output flange of the motor and gearbox assembly by various means. These means may include bolts though apertures in the plate where the apertures are relieved to sink the bolt heads into the plate, the bolt heads being protected in use by polyurethane wear resistant protector plugs pressed into the reliefs. Alternatively, the apertures may be threaded and receive set bolts passed through from the output flange side, with or without the use of sacrificial cap nuts.

Using plate steel for the basket carrier in turn permits the basket carrier to be welded to the screening basket assembly rather than be bolted to the inner ring frame. This has the advantage that the basket and basket carrier assembly may be dynamically balanced as a one-off, ex-factory component. The wear to unserviceability of the plate-to-basket-flange set screws or bolts is avoided completely.

The basket carrier may be welded to a ring frame extending inwardly and radially of the truncated end to form a mounting surface for the periphery of the basket carrier portion, or it may replace the ring frame by the expedient of having the stringer ends welded directly to it. Whether mounting surface ring frame is used as a doubler or whether it is replaced entirely, the wear collar may be welded to the stringers and to either or both of the ring frame and the basket carrier.

The basket carrier may be configured to provide particular advantages. For example, to enable the basket carrier to be relatively light but still stiff enough the deal with torque and harmonic loads, the basket carrier may be reinforced. The reinforcement may be integrated with the basket carrier by fabrication. The stiffening may be by means of, for example, stiffening webs. The basket carrier may be provided with form stiffness such as by dishing or the like.

The basket carrier portion may include a plurality of substantially radial webs located on the working face of the basket carrier portion and extending substantially to the wear collar. Such webs have been found to essentially trap liquid in the space there defined. It has been surprisingly determined that such webs reduce the wear experienced by the basket carrier and wear ring.

The webs may be flat bar welded to the face of the basket carrier portion in the form of radial or other vanes, rings, waffle grids or the like. The radial vanes or other forms may be let into milled slots in the basket carrier portion to increase the sheer section of the penetrating fillet welds.

The webs preferably extend to within a close tolerance of the wear collar. This is for the purposes of interrupting circulation of abrasive entrained particulars about the wear collar. The ends of the webs may be welded to the wear collar.

The webs may be of a number and of a height from the face of the basket carrier in combination to induce a wear reducing hydrostatic zone, or at least a zone where the rotational, sheer interaction with the material having maximum wear at the basket carrier periphery is replaced by a slower and less erosive interaction having much less sheer at the basket carrier periphery. For coarse coal dewatering screens of typical size the plurality of substantially radial webs may comprise at least four substantially radial vanes of at least 40 mm height above the basket carrier face.

The inner ends of the substantially radial vanes may meet at the axial position or may terminate short of it. The substantially radial vanes may be truly radial or may be offset. The impeller effect of the vanes may be reduced by curving the vanes in the direction of rotation to form a stalled rotor. This will tend to reduce radial recycling of materials by centrifugal force.

The basket carrier portion may be dished axially by pressing from flat plate to provide form stiffness. The dishing may produce a generally domed form or alternatively may be substantially conical.

The dishing may leave a peripheral flat flange for securing the basket carrier portion to the basket portion. The basket carrier portion may be installed with its convex dished surface to the working side of the basket carrier portion. By this configuration, the stiffened dished basket carrier portion meets the wear ring at an angle that is acute or at least less obtuse that a flat form would. Where the angle is acute the basket carrier and wear ring may form a shallow annular space of generally wedge shaped section. This may in use form a region of reduced churning, thus reducing wear.

The annular space may be divided circumferentially by a plurality of radial webs to yet further reduce churning. These may be wedge shaped to conform to the cross section of the annular recess and tapering toward the axis of rotation. Alternatively, the basket carrier portion may comprise an axially dished plate steel drive plate presenting a convex substantially conical surface to the working side of the basket carrier portion, and the webs may have a free edge substantially parallel to the conical surface. This may enhance the "spin up" of the product, which otherwise enters the screen member with no angular velocity.

The basket carrier portion may be secured to the drive shaft by any suitable means. For example, the shaft may include a bolt-up coupling flange adapted to cooperate with a bolt pattern about the axial centre of the basket carrier portion.

Where webs are used, the basket carrier may be fabricated to offset the web height which would otherwise encroach on the internal volume of the screen assembly. Accordingly, the basket carrier may include a drive shaft mounting comprising an annular wall welded to the basket carrier portion about an open centre thereof and adapted to pass over a coupling flange of a drive shaft, the annular wall having welded thereto a drive cap plate having a bolt hole pattern to match the coupling flange. The annular wall may form the inner terminus of and be welded to at least some of the webs.

The heads of any bolts retaining the basket carrier portion to the coupling flange are particularly exposed and may be protected by one or more wear elements. For example the heads of bolts retaining the basket carrier portion to the coupling flange may be protected by a bolt head wear protector assembly comprising a body secured to the basket carrier portion by the bolt heads via a compression plate portion and supporting a wear resistant cover or cap adapted in use to isolate at least the bolt heads from the erosive environment in use. Preferably the wear resistant cover is elastomeric and deformable to be fitted and removed from the body in situ, and without specialized tools to expose the bolt heads. The elastomeric cap may extend substantially to the face of the basket carrier portion to substantially seal thereto in use.

The housing may be a conventional screen assembly housing. The housing may be vented to the atmosphere. Venting to atmosphere may be by a vent assembly or be a consequence of an outlet from one or both of the overflow and underflow chambers being in communication with the atmosphere to the effect of venting one or both chambers.

The housing is preferably configured whereby the screen assembly may be installed and withdrawn for servicing through a selectively closable end wall of the housing. For example, the housing may include a closure portion forming a wall of the overflow chamber and closing an access opening disposed in a plane parallel to the outer annular end of the screen. By this means, a screen extractor may pass through the access opening and axially into the screen inner space to attach to and support the screen assembly, which may then be released from the drive shaft and withdrawn axially from the housing through the wall and the access opening. The closure may be hinged to the rest of the housing. The closure may support the inlet assembly whereby opening or removal of the closure withdraws the inlet assembly.

The inlet assembly must pass necessarily through the open base of the screen assembly and so must form an effective conduit through the overflow chamber. For example, the inlet assembly may comprise a conduit secured through a top or side wall of the housing and passing through the overflow chamber with an extension portion extending in to the region of the narrow end of the screen inner volume. Alternatively the inlet assembly may comprise a conduit secured through a closure portion of the housing and passing through the overflow chamber and extending to the region of the narrow end of the screen.

The wall is preferably a substantially vertical septum dividing the housing about the outer annular edge and effectively separating the underflow chamber surrounding the rotating screen from the overflow chamber accepting material passing the outer annular edge. The wall portion containing the opening for the screening assembly is preferably substantially coplanar with the outer annular edge. The screen assembly preferably has minimal run-out in its rotation so the clearance between the outer annular edge and the periphery of the opening in the wall may be kept to a minimum. In view of the potential for jamming by solids, there is preferably an unobstructed radial clearance between the outer annular edge and the periphery of the opening in the wall.

There may be provided a plurality of rotor vanes located on the screen external surface in the underflow chamber zone and selected to impel material away from the dividing wall. It is known to use such vanes to lower the pressure at the screen surface and increase transfer rates through the screen. However, it has been now been found that the use of a plurality of rotor vanes located on the screen in the underflow chamber and selected to impel material away from the dividing wall overcomes a tendency for aerosols and other entrained fines and water being impelled by backflow through a screen outer portion and through any clearance gap between the dividing wall and the outer annular end.

The plurality of rotor vanes located on the screen in the underflow chamber may accordingly be arranged to form an axial impeller. To this end the individual rotor vanes may be straight and inclined to the screen axis or curved to present a selected angle of attack.

The rotor vanes may be formed of a compatible metal and be welded to the screen assembly. For example the rotor vanes may each extend between adjacent ring frames and we welded into position at the rotor vane ends. The rotor vanes may be welded to the back of the screening surface assembly.

The rotor vanes may scroll along the back of the screening surface assembly at constant span, thus tapering in concert with the screen assembly. Alternatively, the rotor vanes may comprise a constant-chord section spanning out from the back of the screening surface assembly with the span progressively increasing along the chord to describe a cylindrical spool.

The rotor vanes may be located adjacent the wall or at any other selected axial position along the screening assembly. Preferably the rotor vanes are locates at a position on the screening assembly selected from positions adjacent the wall to positions approximately mid way in axial extent from the wall to the inner annular end.

In a further aspect the present invention resides broadly in centrifugal screen apparatus including:
  a screen member comprising a substantially conical basket portion having an open base axially spaced from a basket carrier portion substantially closing a truncated end of said basket portion, said screen member being mounted for driven rotation in a housing by said basket carrier;
  an annular wear collar secured to said basket portion about said truncated end adjacent an outer periphery of said basket carrier;
  a plurality of webs located on said basket carrier portion and dividing a surface of the basket carrier portion into a plurality of recesses distributed circumferentially about said annular wear collar;
  an inlet assembly passing into the housing and directing a material to be screened toward basket carrier portion; and
  a wall dividing the housing substantially about the outer open base and defining an underflow chamber surrounding the rotating screen and an overflow chamber accepting material passing through the open base.

The plurality of webs located on the basket carrier and dividing a surface of the basket carrier into a plurality of recesses may comprise integrally formed webs cast in situ on a conventionally-cast steel basket carrier adapted to be bolted or set screwed up to this mounting surface.

However, the effect of the webs cooperating with the annular wear collar is to provide a relatively hydrostatic layer against the basket carrier surface, which has been found to greatly reduce wear. By this means it has been found that a sheet or plate steel basket carrier can be used that has a wear life substantially the same as the screening basket. In this case, webs may be flat bar welded to the face of the basket carrier in the form of radial or other vanes, rings, waffle grids or the like. The radial vanes or other forms may be let into milled slots in the basket carrier to increase the sheer section of the penetrating fillet welds.

BRIEF DESCRIPTION OF THE DRAWINGS

The invention will be described with reference to the following non-limiting embodiment of the invention as illustrated in the drawings and wherein.

Figure 1:
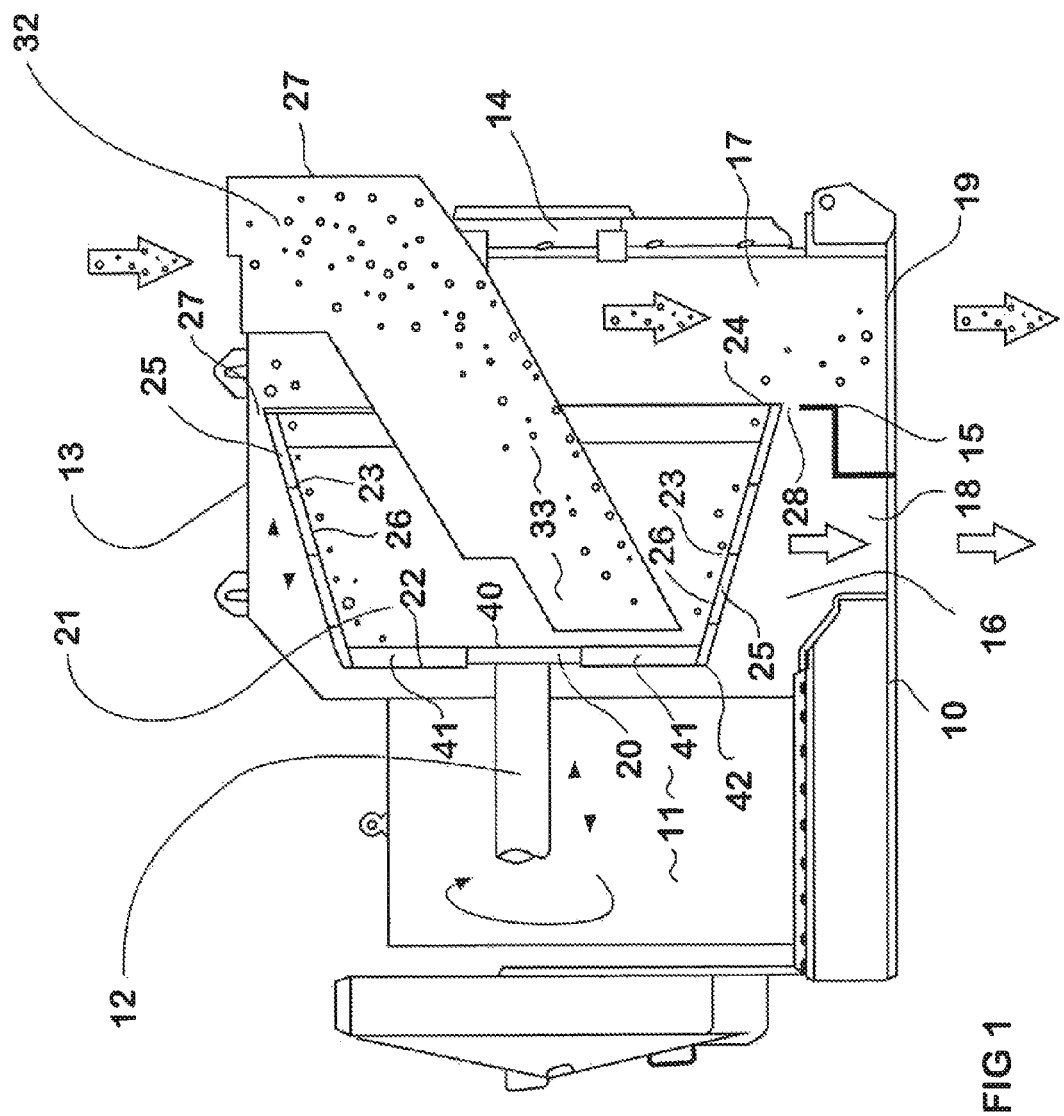
FIG. 1 is vertical section containing the axis of apparatus in accordance with the present invention.

In the FIGS. 1 to 4, there is provided a centrifugal screening apparatus including a mounting base 10 supporting a drive assembly 11 driving a shaft 12. The mounting base 10 and drive assembly 11 mutually support a screen housing 13 which is closed by a removable closure 14 and is divided by a dividing wall 15 into an underflow chamber 16 and an overflow chamber 17. The underflow chamber 16 passes water and fines to an underflow outlet 18 passing through the mounting base 10. The overflow chamber 17 passes screened coal to a delivery outlet 19 passing out of the housing 13.

The shaft 12 has a drive flange 20 secured to its end, the drive flange supporting for rotation a frusto-conical screen assembly 21. The screen assembly 21 comprises a 16 mm hot rolled plate steel basket carrier portion 22 bolted to the drive flange 20. The basket carrier portion 22 is axially spaced from intermediate ring frames 23 and an outer frame ring and flange 24. The respective basket carrier portion 22, outer frame ring 24 and ring frames 23 are interconnected by circumferentially spaced stringers 25 to describe an all-welded, integral, generally truncated-conical cage. The cage supports a wedge wire screening surface 26. The closure 14 and housing 13 mutually support an inlet assembly 27. The ring and flanges 22, 24, ring frames 23 and stringers 25 are all formed from steel flat bar and plate as appropriate.

The dividing wall 15 has a large circular opening in which the flange of the outer frame ring and flange 24 runs at a minimum clearance annulus indicated at 28.

The inlet assembly 27 comprises a chute portion 32 receiving water and coarse coal from crushing and washing and an injector portion 33 feeding the water and coarse coal to the inner end of the screen assembly 21.

Figure 2:
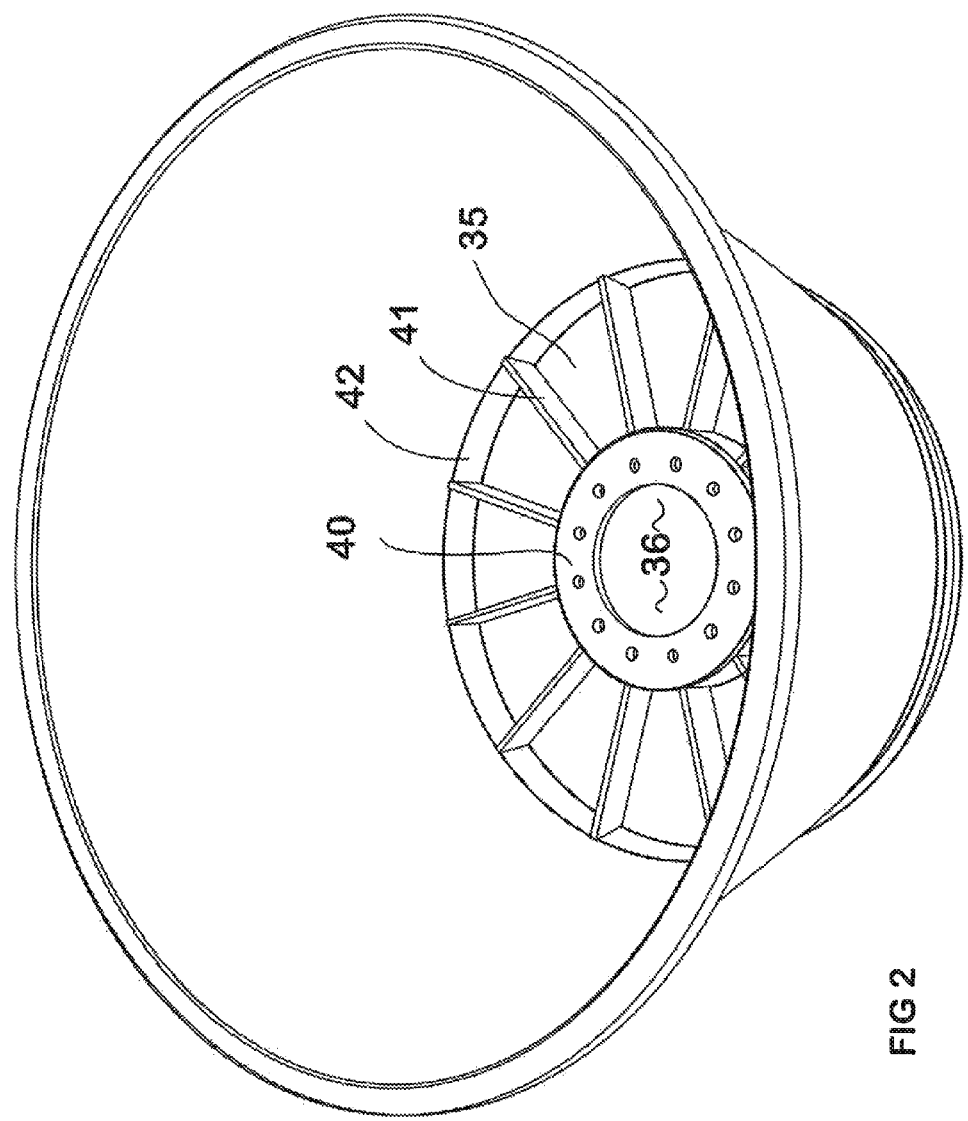
FIG. 2 is a perspective view of a screen for use in the apparatus of FIG. 1.
Figure 3:
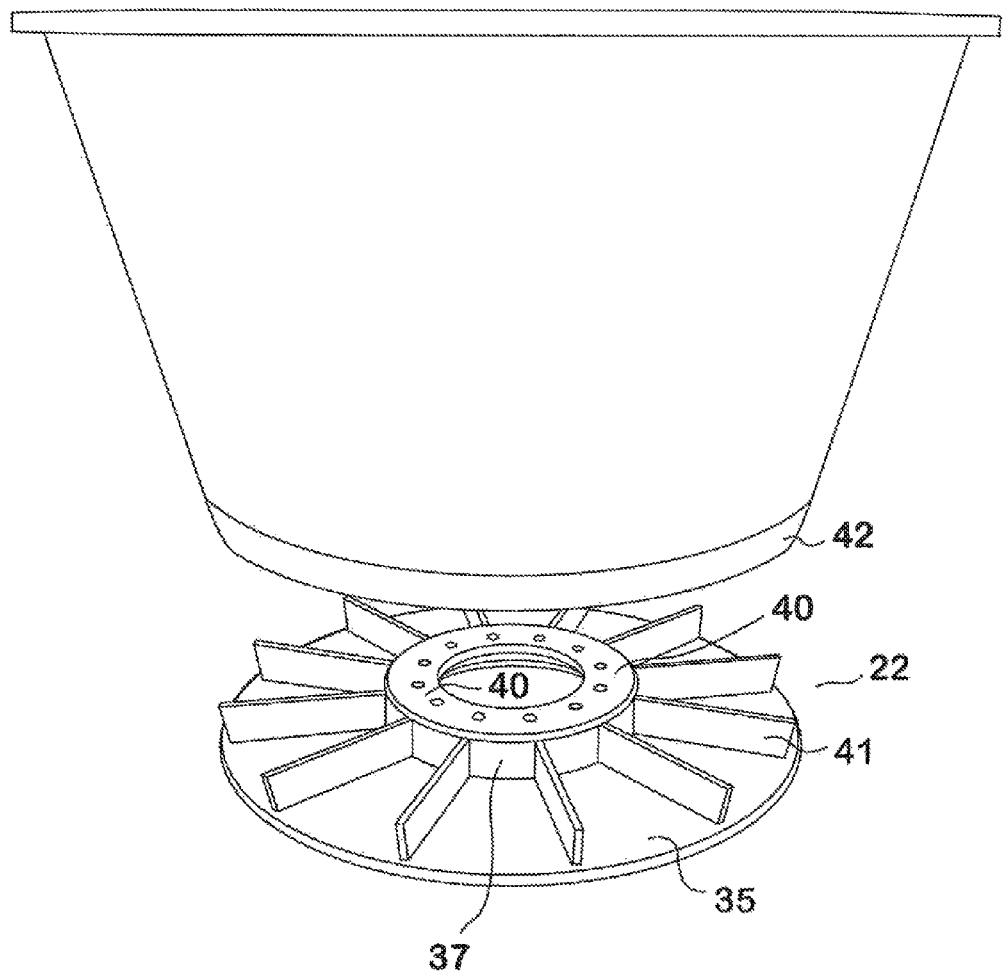
FIG. 3 is an exploded perspective view of the screen of FIG. 2.
Figure 4:
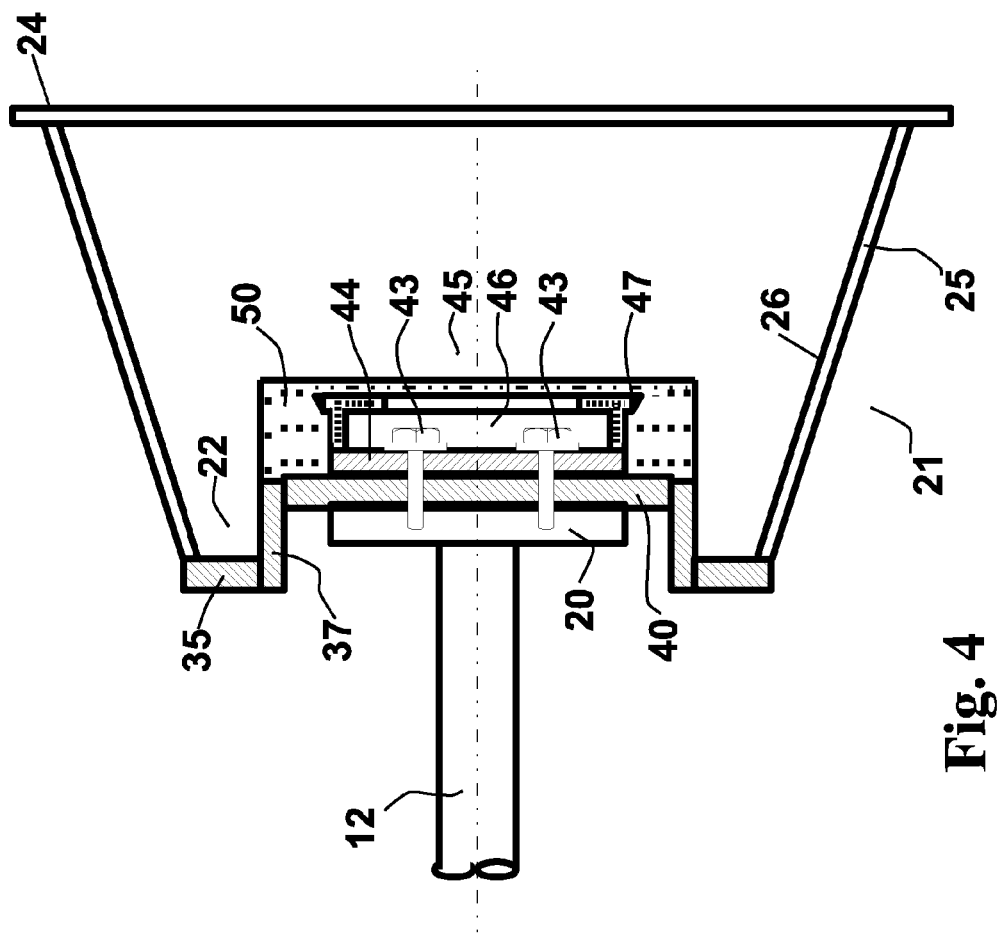
FIG. 4 is a detail view of the drive shaft mounting of the apparatus of FIG. 1.

The frusto-conical screen assembly 21 is illustrated in FIGS. 2 and 3 with the frame detail omitted for clarity. The basket carrier portion 22 comprises a 16 mm hot rolled plate 35 having a hole 36 formed therein, the edge of which is fabricated to a turret wall 37. A cap plate 40 is welded to the upper edge of the turret wall 37 and is provided with a bolt pattern of pitch circle and pattern selected to bolt up to the drive flange 20. The turret wall 37 and plate 35 have welded thereto twelve radial vanes 41. The inner end of the screen assembly 21 includes a wear collar 42 to which the plate 35 and vane 41 ends are welded.

The cap plate 40 is bolted to the drive flange 20 via bolts 43 via a compression plate 44 forming part of a bolt head protector assembly 45. The bolt head protector assembly 45 includes an open faced bolt head housing 46 having a peripheral bead 47. A polyurethane elastomer wear resistant cover 50 is in use snapped over the bolt head housing 46 to be retained by the bead 47, the cover 50 substantially sealing against the periphery of the drive flange 20 in use.

Figure 5:
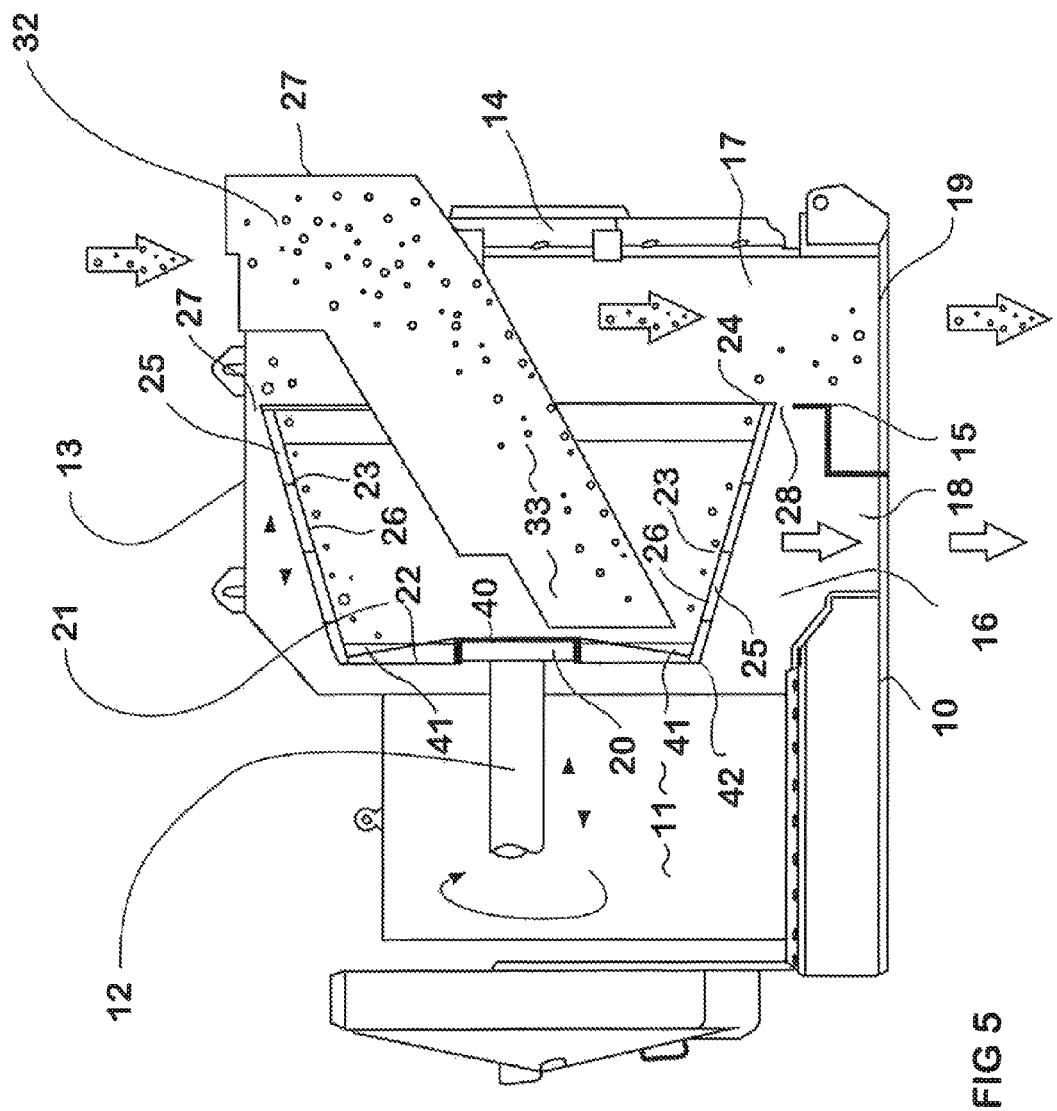
FIG. 5 is a view substantially as per FIG. 1, with an alternative basket carrier portion shown.

In the alternative embodiment of FIG. 5, the 16 mm hot rolled plate steel basket carrier portion 22 is dished to provide form stiffness and resistance to cracking by pressing to a shallow conical form having an integral cap plate portion 40. The basket carrier portion 22 and wear collar 42 cooperate to form a wedge shaped annular space. The radial vanes 41 in this embodiment are wedge shaped radial vanes conforming to the cross section to form circumferentially arranged spaces as before.

Figure 6:
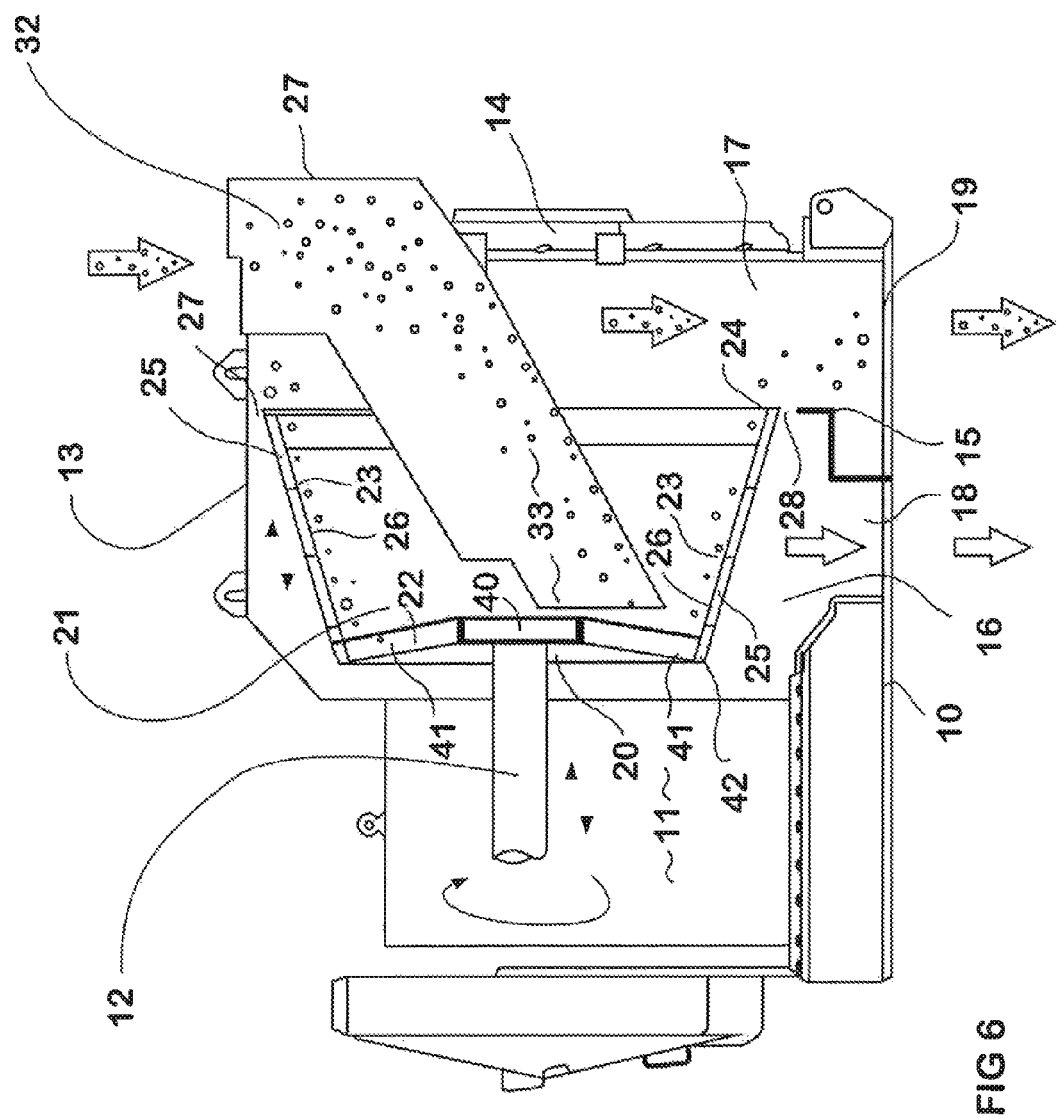
FIG. 6 is a view substantially as per FIG. 1, with a yet further alternative basket carrier portion shown.

In the yet further alternative embodiment of FIG. 6, the 16 mm hot rolled plate steel basket carrier portion 22 is dished as per FIG. 5. However, as per the embodiment of FIGS. 1 to 4, the hot rolled plate 35 has a hole 36 formed therein, the edge of which is fabricated to a turret wall 37. A cap plate 40 is welded to the upper edge of the turret wall 37 and is provided with a bolt pattern of pitch circle and pattern selected to bolt up to the drive flange 20. The turret wall 37 and plate 35 have welded thereto eight radial vanes 41. The inner end of the screen assembly 21 includes a wear collar 42 to which the plate 35 and vane 41 ends are welded.

It will of course be realised that while the above has been given by way of illustrative example of this invention, all such and other modifications and variations thereto as would be apparent to persons skilled in the art are deemed to fall within the broad scope and ambit of this invention as is set forth in the claims appended hereto.

The invention claimed is:

1. Centrifugal screen apparatus including:
   a screen member comprising a substantially conical basket portion including a supporting structure comprising axially spaced ring frames interconnected by a plurality of stringers and having an open base axially spaced from an integral basket carrier portion substantially closing a truncated end of said substantially conical basket portion, said screen member being mounted for driven rotation in a housing by said basket carrier portion;
   a drive shaft mounting comprising an annular wall welded to the basket carrier portion about an open center thereof and adapted to pass over a coupling flange of a drive shaft, the annular wall having welded thereto a drive cap plate;
   an annular wear collar secured to each of the stringers, a ring frame and the basket carrier portion about said truncated end adjacent an outer periphery of said basket carrier portion;
   a plurality of substantially radial webs located on a working face of the basket carrier portion and extending between the annular wear collar and the annular wall and dividing the working face into a plurality of recesses distributed circumferentially about said annular wear collar and each forming a wear reducing hydrostatic zone against the working face in use;
   an inlet assembly passing into the housing and directing a material to be screened toward said basket carrier portion; and
   a wall member substantially dividing the housing about the outer said open base and defining an underflow chamber surrounding the rotating screen and an overflow chamber accepting material passing through the open base.

2. Centrifugal screen apparatus according to claim 1, wherein said supporting structure is of stainless or other steel.

3. Centrifugal screen apparatus according to claim 1, wherein said substantially conical basket portion includes a screening surface defined by a plurality of wedge wires.

4. Centrifugal screen apparatus according to claim 1, wherein said basket carrier portion comprises a steel drive plate.

5. Centrifugal screen apparatus according to claim 4, wherein the basket carrier portion is bolted to a drive shaft by bolts though apertures in the steel drive plate and wherein one or more of the apertures are relieved to sink one or more bolt heads into the plate, the bolt heads being protected in use by wear resistant protector plugs pressed into the reliefs.

6. Centrifugal screen apparatus according to claim 1, wherein the basket carrier portion is reinforced by form stiffening provided by axial dishing of the basket carrier portion.

7. Centrifugal screen apparatus according to claim 1, wherein outer ends of the webs are welded to the wear collar.

8. Centrifugal screen apparatus according to claim 1, wherein the plurality of substantially radial webs comprises at least four substantially radial vanes of at least 40 mm height above the basket carrier face.

9. Centrifugal screen apparatus according to claim 6, wherein said basket carrier portion comprises a steel drive plate which is dished axially to present a convex surface forming with said wear collar an annular space of generally wedge shaped section.

10. Centrifugal screen apparatus according to claim 1, wherein the drive cap plate has a bolt hole pattern to match the coupling flange.

11. Centrifugal screen apparatus according to claim 10, wherein the basket carrier portion comprises an axially dished plate steel drive plate presenting a convex substantially conical surface, and said webs have a free edge substantially parallel to the conical surface.

12. Centrifugal screen apparatus according to claim 10, including bolts retaining the basket carrier portion to the coupling flange having bolt heads protected by a bolt head wear protector assembly comprising a bolt head wear protector body secured to the basket carrier portion by the bolt heads via a compression plate portion and supporting a wear resistant cover or cap adapted in use to isolate at least the bolt heads from the erosive environment in use.

13. Centrifugal screen apparatus according to claim 12, wherein the wear resistant cover is elastomeric and deformable to be fitted and removed from the bolt head wear protector body in situ.

14. Centrifugal screen apparatus according to claim 13, wherein the elastomeric cover extends substantially to the face of the basket carrier portion to substantially seal thereto in use.

15. Centrifugal screen apparatus according to claim 1, wherein there is provided a plurality of rotor vanes located on the screen external surface in the underflow chamber zone and selected to impel material away from the dividing wall member.

16. Centrifugal screen apparatus according to claim 15, wherein the plurality of rotor vanes located on the screen in the underflow chamber are arranged to form an axial impeller.

* * * * *